United States Patent [19]
Maekawa

[11] Patent Number: 5,625,376
[45] Date of Patent: Apr. 29, 1997

[54] ACTIVE MATRIX DISPLAY DEVICE

[75] Inventor: Toshikazu Maekawa, Kanagawa, Japan

[73] Assignee: Sony Corporation, Tokyo, Japan

[21] Appl. No.: 267,608

[22] Filed: Jun. 29, 1994

[30] Foreign Application Priority Data

Jun. 30, 1993 [JP] Japan ................................ 5-189079

[51] Int. Cl.$^6$ ........................................................ G09G 5/00
[52] U.S. Cl. ................................................ 345/132; 345/197
[58] Field of Search ................................ 345/3, 87, 92, 345/98, 100, 103, 132, 204, 197; 348/751, 766, 790, 792

[56] References Cited

U.S. PATENT DOCUMENTS

| 4,998,100 | 3/1991 | Ishii | 348/790 |
|---|---|---|---|
| 5,442,372 | 8/1995 | Shiki | 345/100 |

FOREIGN PATENT DOCUMENTS

| 0456165A3 | 11/1991 | European Pat. Off. |
|---|---|---|
| 2260058 | 3/1993 | United Kingdom . |

OTHER PUBLICATIONS

Patent Abstracts of Japan, No. JP 02-143 781, vol. 14, No. 391, Jun. 1, 1990 entitled "Matrix Display Panel Driving DEvice.".

*Primary Examiner*—Richard Hjerpe
*Assistant Examiner*—Kara Farnandez Stoll
*Attorney, Agent, or Firm*—Hill, Steadman & Simpson

[57] ABSTRACT

An active matrix display device is disclosed which realizes changing over between a wide display and a normal display with a simple construction. The active matrix display device includes picture elements disposed in rows and columns on a horizontally elongated screen. A gate line is connected to each picture element row, while a data line is connected to each picture element column. A signal line for supplying a video signal and data lines are connected by way of sampling switches. A horizontal shift register controls sequential opening and closing operations of the sampling switches. The picture element columns of the horizontally elongated screen are divided into a predetermined area allocated to a normal display and a pair of expansion areas included in a wide display. The horizontal shift register is divided into a predetermined stage section corresponding to the predetermined area and expansion stage sections corresponding to the expansion areas. For a wide display, the predetermined and expansion stage sections of the horizontal shift register are interconnected serially into an integrated condition, but upon normal display, the expansion stage sections are disconnected from the predetermined stage section.

6 Claims, 6 Drawing Sheets

IH

IH

ACTIVE MATRIX DISPLAY DEVICE

BACKGROUND OF THE INVENTION

1. Field of the Invention

This invention relates generally to an active matrix display device, and particularly to a driving system for an active matrix display device which can change over between a display having an aspect ratio of 16:9 and another display having an aspect ratio of 4:3, and also to a horizontal shift register for driving an active matrix display device by line sequential horizontal driving.

2. Description of the Related Art

Development of active matrix display devices conforming to the high definition television standards has occurred in recent years. An active matrix display device conforming to the high definition television standards has such a horizontally elongated screen as shown in FIG. 5 and allows a display of the aspect ratio of 16:9 (such a display will be hereinafter referred to as a wide display). A large number of picture elements PXL are disposed in rows and columns on the screen so as to satisfy the aspect ratio of 16:9. Meanwhile, another active matrix display device having an ordinary screen size performs another display of the aspect ratio of 4:3 (such display will be hereinafter referred to as a normal display). In an active matrix display device of the high definition television standards, a structure which allows changing over between a wide display and a normal display is known. In order to perform a wide display with the active matrix display device of the high definition television standards, all picture element columns are used, as seen in FIG. 5. On the other hand, in order to effect a normal display, since a conversion in aspect ratio to 4:3 is involved, only those picture element columns which belong, for example, to a central area B shown in FIG. 5 are used to construct a display screen. In this instance, areas A and C on the opposite sides of the central area B are masked, for example, with side black.

Various means have been proposed for a changing over method between a wide display and a normal display. One of such methods involves compression processing of a video signal as illustrated in FIGS. 6(A) and 6(B). When a video signal for a normal display is input as seen from the waveform of FIG. 6(A), it is first converted by A/D conversion into digital data. In order to distribute the digital data only to the central area B of the horizontally elongated screen shown in FIG. 5, compression processing for each one horizontal period (1H) is performed at a desired ratio as seen from the waveform of FIG. 6(B). The digital data obtained by the compression processing is distributed to area B while fixed data for a masked display are supplied to the areas A and C (FIG. 5) on the opposite sides of the area B. However, the present compression processing method has a problem to be solved in that a digital processing circuit to be externally added is large in scale and has increased cost. Another structure has been proposed and is known wherein a mechanical shutter is disposed at each of the areas A and C at the opposite ends of the horizontally elongated screen in place of a masked display which is based on electronic processing. However, the alternative structure has another problem to be solved in that, since a physical mechanism is required, it is complicated in structure, which can be a cause of failure.

SUMMARY OF THE INVENTION

It is an object of the present invention to provide an active matrix display device which allows changing over between a wide display and a normal display with a simple structure.

In order to attain the object described above, according to an aspect of the present invention, there is provided an active matrix display device which comprises a plurality of picture elements disposed in rows and columns on a horizontally elongated screen, the columns of the picture elements being divided into a first area allocated to a normal display and a second area included in a wide display, a gate line connected to each of the rows of the picture elements, a vertical drive circuit connected to the gate lines, a data line connected to each of the columns of the picture elements, a signal line for supplying a video signal, a plurality of sampling switches for interconnecting the signal line and the data lines, and a horizontal shift register for controlling sequential opening and closing operations of the sampling switches, the horizontal shift register being divided into a predetermined stage section which corresponds to those of the columns of the picture elements in the first area and an expansion stage section which corresponds to those of the columns of the picture elements in the second area.

Preferably, the shift register is divided into a first stage section, a second stage section, and a third stage section, and the predetermined station section corresponds to the second stage section while the expansion stage section corresponds to the first and third stage sections. In this instance, preferably the active matrix display device further comprises a first gate circuit connected to an input terminal of the first stage section, a second gate circuit interposed between an output of the first stage section and an input terminal of the second stage section, a third gate circuit interposed between an output terminal of the second stage section and an input terminal of the third stage section, and means for switchably controlling the first, second and third gate circuits.

Preferably, the active matrix display device further comprises masking means for supplying, upon normal display, a signal of a fixed level to those data lines which belong to the second area to mask the second area.

In the active matrix display device, the horizontal shift register, which is formed from a multiple connection of flipflops, is divided into the predetermined stage section and the expansion stage section. The predetermined stage section corresponds to a normal display while the expansion stage section corresponds to an expansion area when a wide display is performed. The predetermined stage section and the expansion stage section are interconnected by way of the gate circuits. In a wide display, the predetermined stage section and the expansion stage section are serially connected to each other into an integrated condition by way of the gate circuits, but in a normal display, the expansion stage section is disconnected from the predetermined stage section. In this manner, changing over between a wide display and a normal display can be realized by a simple construction wherein gate circuits are added to the horizontal shift register of a divisional construction. Accordingly, the active matrix display device is advantageous in terms of the cost, since particularly complicated digital processing of a video signal is not required.

According to another aspect of the present invention, there is provided a horizontal shift register, which comprises a first stage section corresponding to columns of normal display picture elements allocated to a normal display when the normal display is provided by part of a horizontally elongated screen, a second stage section corresponding to columns of wide display picture elements included in a wide display when the wide display is provided by the entire horizontally elongated screen, and means for controlling connection and disconnection between the first and second stage sections such that, upon a wide display, the first and second stage sections are serially connected into an integrated condition so as to effect sequential selection control of all of the columns of the normal display picture elements and the wide display picture upon normal display, however, the second stage section is disconnected from the first stage section so as to effect a sequential selection control of the columns only of the normal display picture elements. Preferably, the horizontal shift register further comprises a masking means for masking the columns of the wide display picture elements upon normal display.

The above and other objects, features and advantages of the present invention will become apparent from the following description and the appended claims, taken in conjunction with the accompanying drawings in which like parts or elements are denoted by like reference characters.

DESCRIPTION OF THE PREFERRED EMBODIMENT

Figure 1:
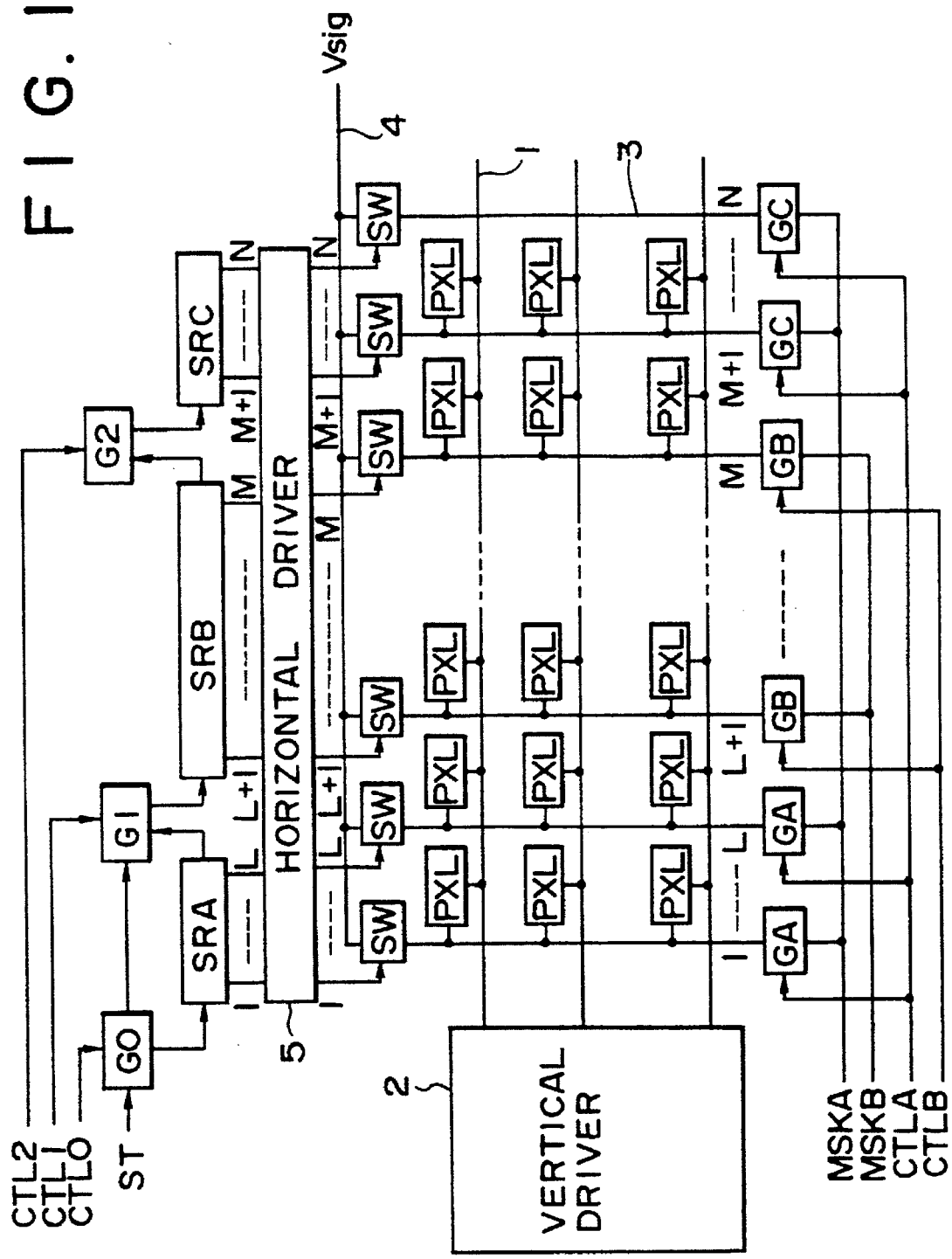
FIG. 1 is a circuit diagram of an active matrix display device showing a preferred embodiment of the present invention.

Referring first to FIG. 1, there is shown a basic construction of an active matrix display device according to the present invention. The active matrix display device shown includes a plurality of picture elements (PXL) disposed in rows and columns on a horizontally elongated screen. A gate line 1 is connected to each of the rows of the picture elements. A vertical driver or vertical drive circuit 2 is connected to the gate lines 1. A data line 3 is connected to each of the columns of the picture-elements. A signal line 4 is provided for supplying a video signal or image signal Vsig to the picture elements. The signal line 4 and the data lines 3 are connected to each other by way of a plurality of sampling switches SW. The sampling switches SW are sequentially operated to open or close under the control of a horizontal shift register (SR) by way of a horizontal driver 5.

The picture element columns of the horizontally elongated screen are divided into a predetermined area allocated to a normal display and a pair of expansion areas included in a wide display. In the present embodiment, the predetermined area includes the picture element columns from the L+1th to the Mth picture element columns inclusive, while the expansion areas include the picture element columns from the first to Lth picture element columns inclusive and from the M+1th to Nth picture element columns both inclusive. In the meantime, the horizontal shift register (SR) is divided into three stage sections including a predetermined stage section SRB corresponding to the picture element columns of the predetermined area and a pair of expansion stage sections SRA and SRC corresponding to the picture element columns of the expansion areas. For wide display, the predetermined stage section SRB and the expansion stage sections SRA and SRC of the horizontal shift register are serially connected into an integrated condition and sequentially operate the sampling switches SW to open or close them. Upon normal display, the expansion stage sections SRA and SRB of the horizontal shift register (SR) are disconnected from the predetermined stage section SRB, and only those sampling switches SW which belong to the predetermined area are sequentially operated to open or close.

Again, in the present embodiment, the horizontal shift register is divided into three portions including the expansion front stage section SRA, the predetermined middle stage section SRB, and the expansion rear stage section SRC. A first gate circuit G0 is connected to an input terminal of the expansion front stage section SRA. A second gate circuit G1 is interposed between an output terminal of the expansion front stage section SRA and an input terminal of the predetermined middle stage section SRB. A third gate circuit G2 is interposed between an output terminal of the predetermined middle stage section SRB and an input terminal of the expansion rear stage section SRC. The gate circuits G0, G1 and G2 are controlled to be switched by control signals CTL0, CTL1 and CTL2, respectively, to selectively perform connection integration and disconnection of the horizontal shift register. A start signal ST for the shift register is supplied to the first gate circuit G0 at the top of the three gate circuits G0, G1 and G2.

The active matrix display device further includes masking means, and upon normal display, a signal (masking signal) of a fixed level is supplied to the data lines 3 which belong to the expansion areas to selectively effect masked display of the expansion areas (side black display). In the present embodiment, the masking means is formed from a plurality of gate elements GA which belong to one of the expansion areas, another plurality of gate elements GB which belong to the central predetermined area, and a further plurality of gate elements GC which belong to the other expansion area. The gate elements GA are individually connected to the gate lines 3 which correspond to the first to Lth picture element columns. The gate elements GB are individually connected to the gate lines 3 which correspond to the L+1th to Mth picture element columns. The gate elements GC are connected to the gate lines 3 which correspond to the M+1th to Nth picture element columns. The gate elements GA and GC receive a masking signal MSKA, and the gate electrodes GB receive another masking signal MSKB. The gate elements GA and GC are controlled to be opened or closed by a control signal CTLA, and the gate elements GB are controlled to be opened or closed by another control signal CTLB.

Figure 2:
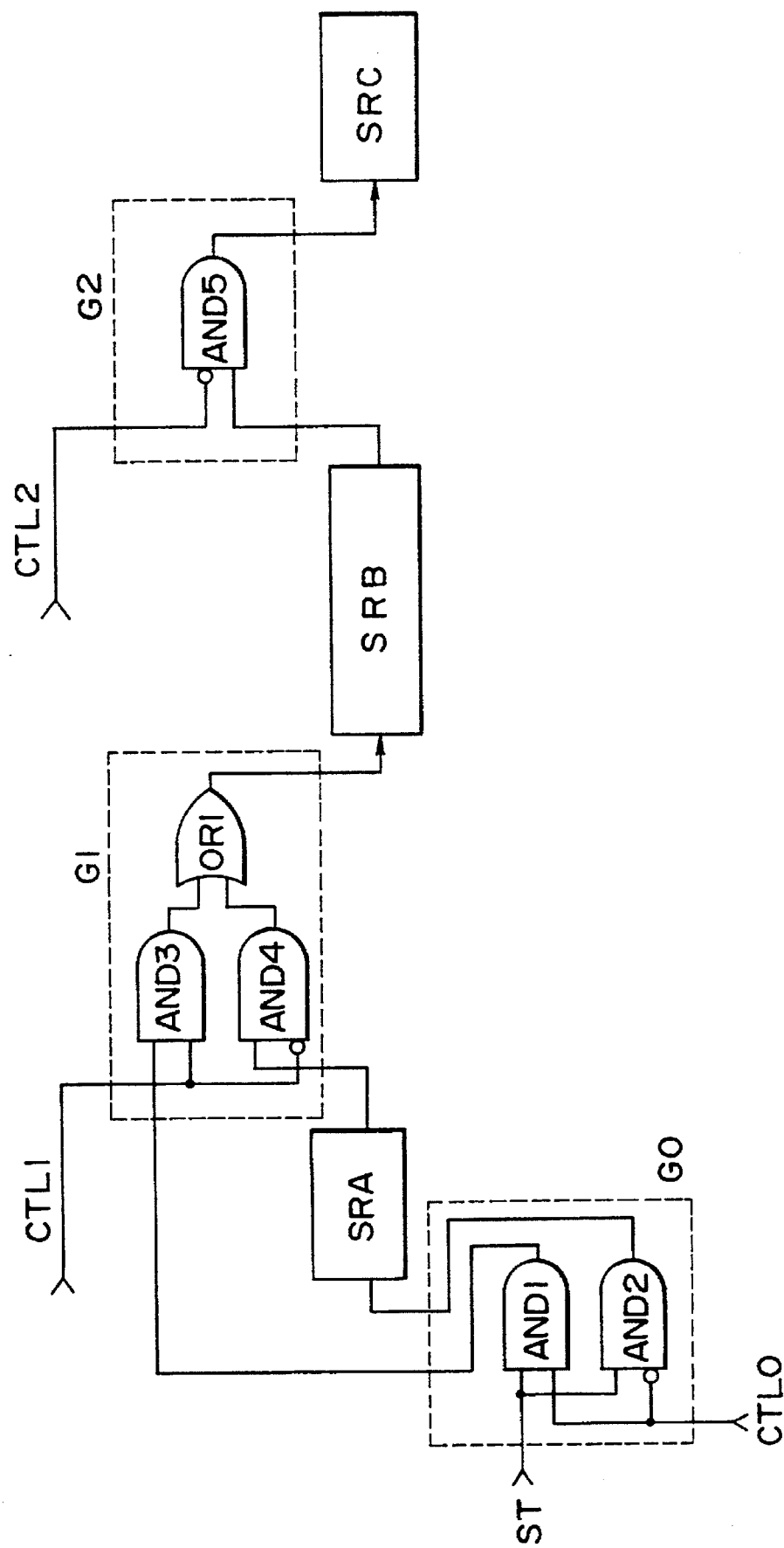
FIG. 2 is a block diagram showing a gate circuit of the active matrix display device shown in FIG. 1.

Subsequently, operation of the active matrix display device shown in FIG. 1 will be described in detail with reference to FIGS. 2 to 4. FIG. 2 shows a detailed circuit construction of the gate circuits G0, G1 and G2. Referring first to FIG. 2, the first gate circuit G0 is formed from a pair of AND elements AND1 and AND2. The second gate circuit G1 is formed from a pair of AND elements AND3 and AND4 and a single OR circuit OR1. The third gate circuit G2 is formed from a single AND element AND5. In the construction, when a wide display is effected, all of the control signals CTL0, CTL1 and CTL2 are set to a low level by an external control circuit. It is to be noted that, in some cases, the control signals CTL0, CTL1 and CTL2 may be supplied from a common control line. For a wide display, when the control signal CTL0 is set to a low level, the AND element AND1 is closed while the AND element AND2 is opened. As a result, a start signal ST input to the first gate circuit G0 is supplied to the expansion front stage section SRA of the horizontal shift register by way of the AND element AND2. The expansion front stage section SRA sequentially transfers the start signal ST in synchronism with a predetermined clock signal to sequentially open the sampling switches SW corresponding to the first column to the Lth column by way of the horizontal driver 5 (FIG. 1). As a result, a video signal Vsig supplied from the signal line 4 is sampled to the data lines 3 which correspond to the picture element columns from the first column to the Lth column. Subsequently, at the second gate circuit G1, the AND element AND3 is in a closed condition while the AND element AND4 is in an open condition. Consequently, an output signal of the expansion front stage section SRA is supplied to an input terminal of the predetermined middle stage section SRB by way of the AND element AND4 and the OR circuit OR1. Also the predetermined middle stage section SRB sequentially performs signal transfer in a similar manner as described above to control and drive the corresponding L+1th to Mth picture element columns. Finally, since the control signal CTL2 is at a low level, the AND element AND5 of the third gate circuit G2 is in an open state. Accordingly, an output signal of the predetermined middle stage section SRB passes the AND element AND5 and is input to the expansion rear stage section SRC. The expansion rear stage section SRC performs signal transfer in a similar manner as described above to control and sequentially drive the corresponding M+1th to Nth picture element columns. As a result of the operation described above, all of the first to Nth picture element columns are sequentially driven to effect a wide display.

On the other hand, upon normal display, the control signals CTL0, CTL1 and CTL2 are set to a high level. In this instance, the AND element AND1 of the first gate circuit G0 is opened, and the AND element AND2 is closed. Accordingly, a start signal ST input to the first gate circuit G0 is input to the second gate circuit G1 through the AND element AND1. Consequently, the expansion front stage section SRA of the horizontal shift register is put into a disconnected condition. When the control signal CTL1 is at a high level, the AND element AND3 of the second gate circuit G1 is opened and the AND element AND4 is closed. Consequently, the start signal ST passes the AND element AND3 and the OR circuit OR1 and is supplied to the input terminal of the predetermined middle stage section SRB. The predetermined middle stage section SRB sequentially transfers the start signal ST to drive the corresponding L+1th to Mth picture element columns by way of the horizontal driver 5 and the corresponding switching elements SW. Finally, when the control signal CTL2 is at a high level, the AND element AND5 of the third gate circuit G2 is in a closed condition. Consequently, an output signal of the predetermined middle stage section SRB cannot pass the third gate circuit G2. Consequently, the expansion rear stage section SRC is put into a disconnected condition. Due to the operations described above, upon normal display, only the predetermined middle stage section SRB effects a signal transfer operation.

Figure 3:
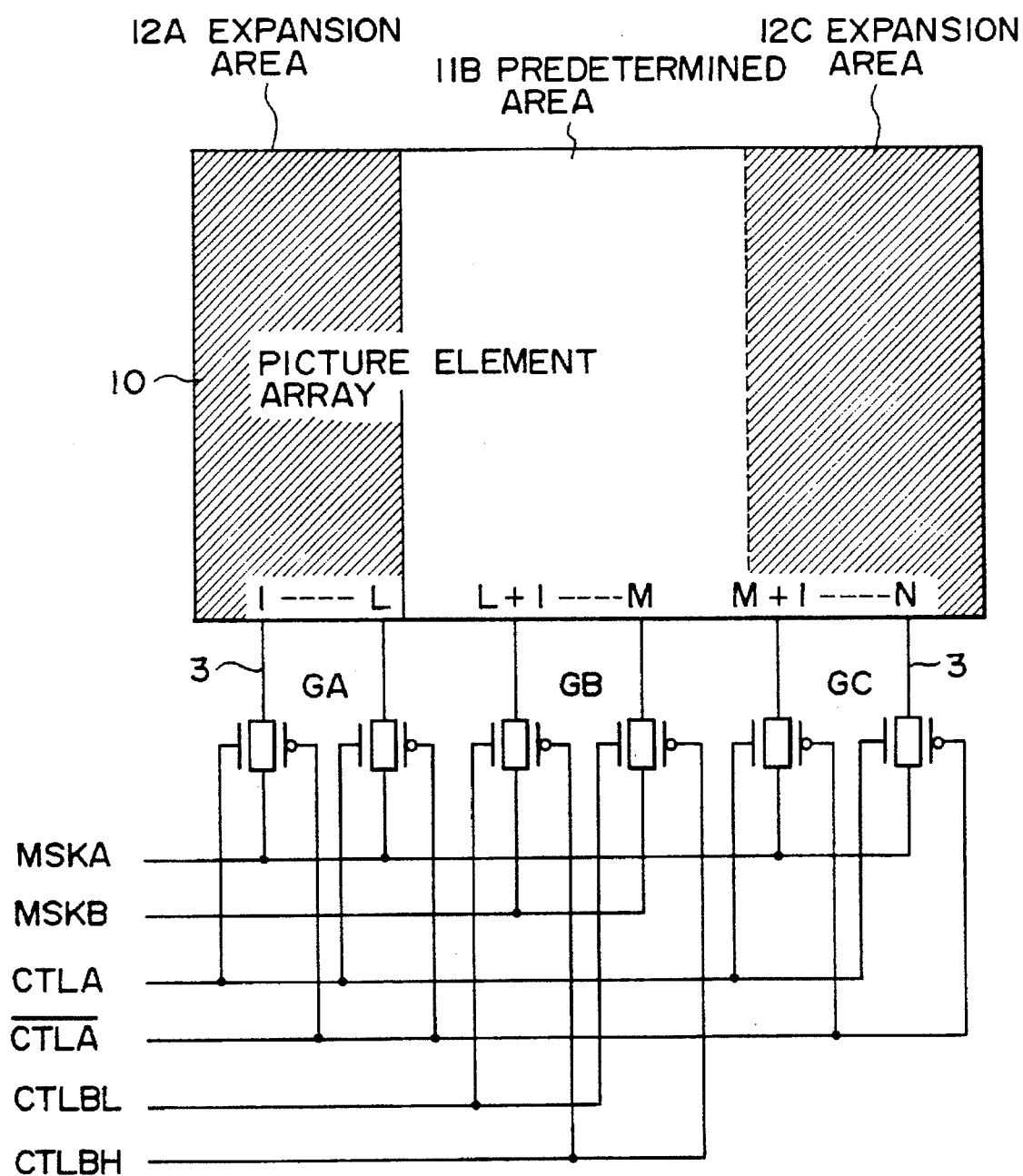
FIG. 3 is a circuit diagram showing masking means of the active matrix display device shown in FIG. 1.
Figure 4:
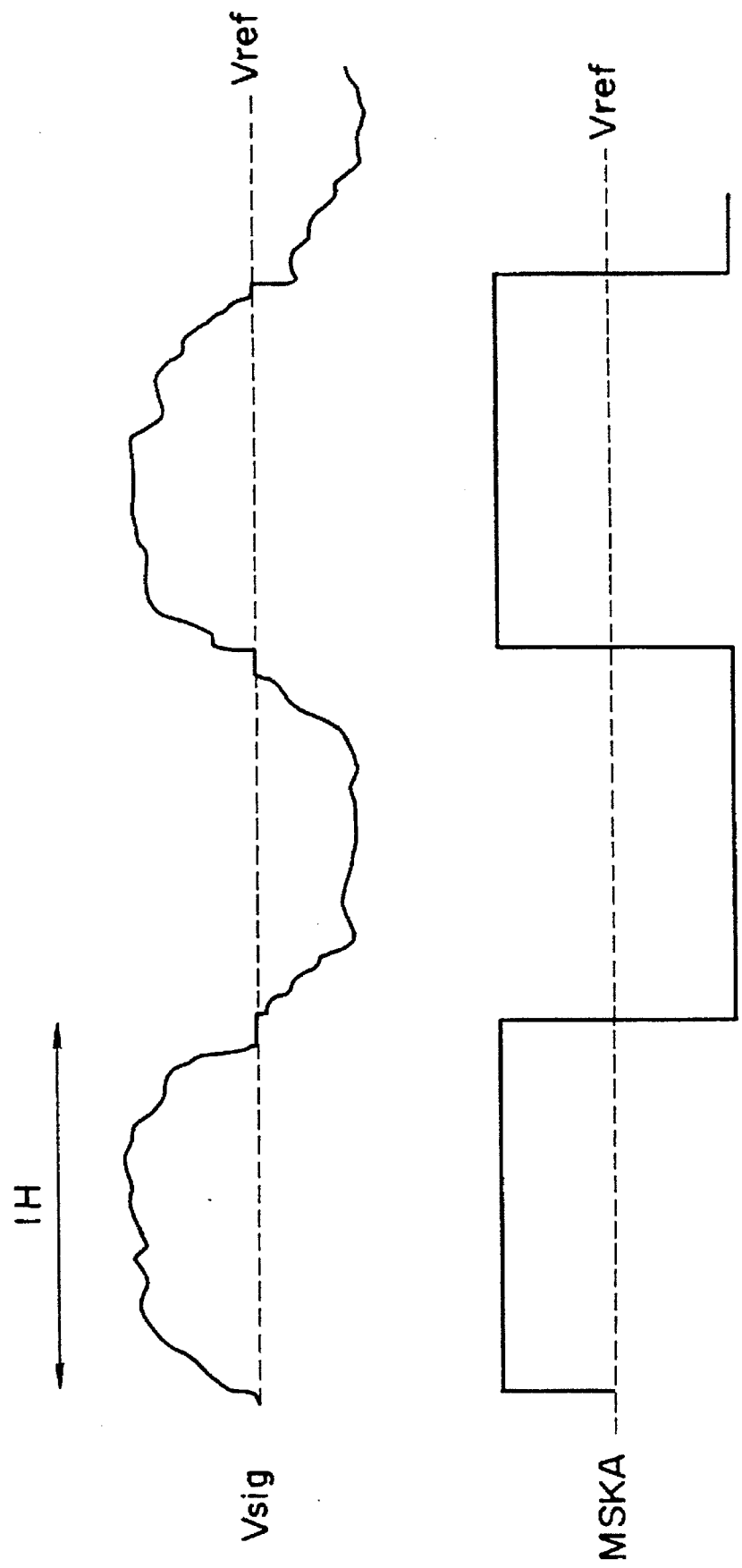
FIG. 4 is a waveform diagram showing the waveform of a masking signal.
Figure 5:
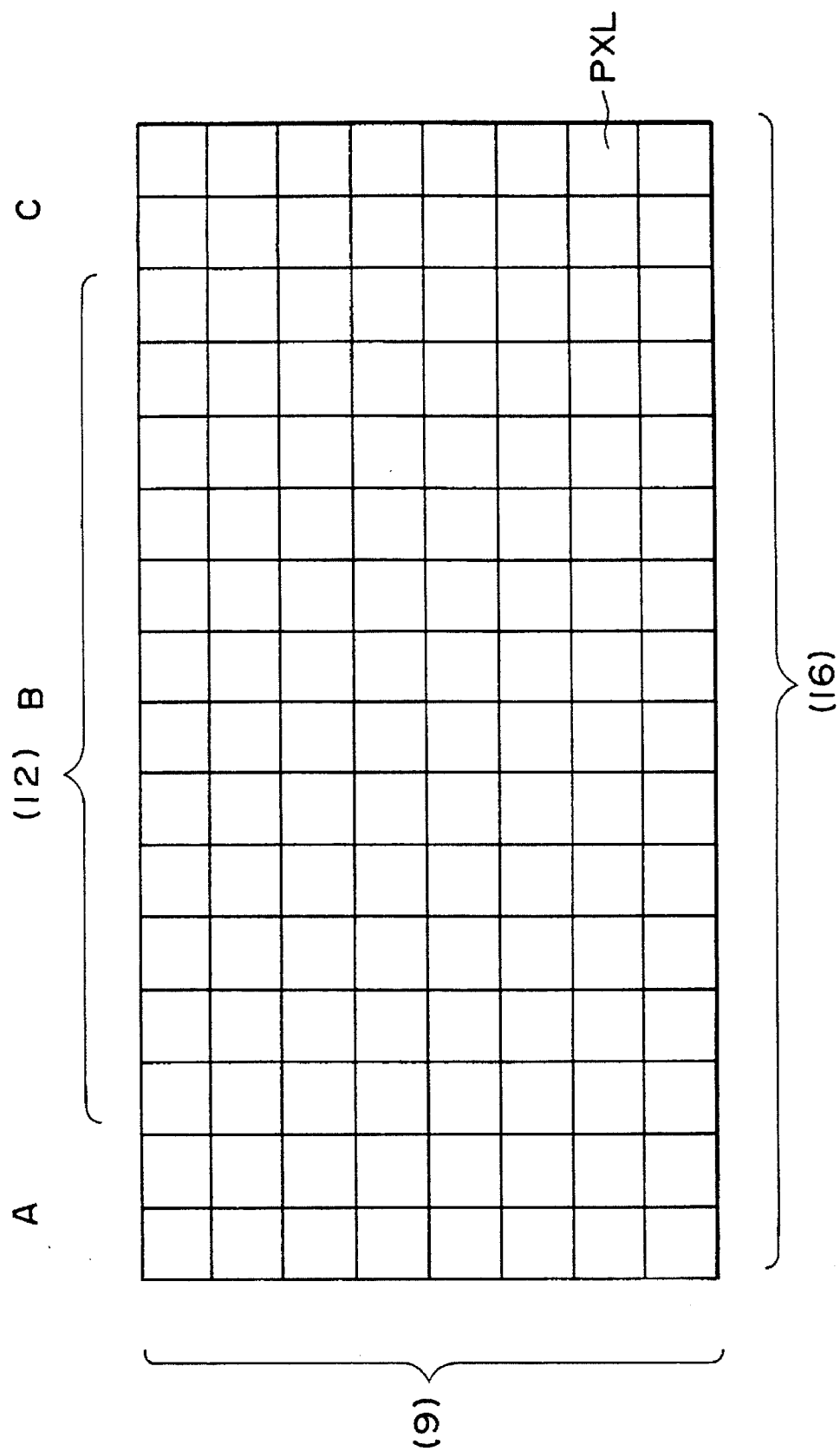
FIG. 5 is a diagrammatic view showing the construction of a screen of an active matrix display device for a wide display.
Figure 6A:
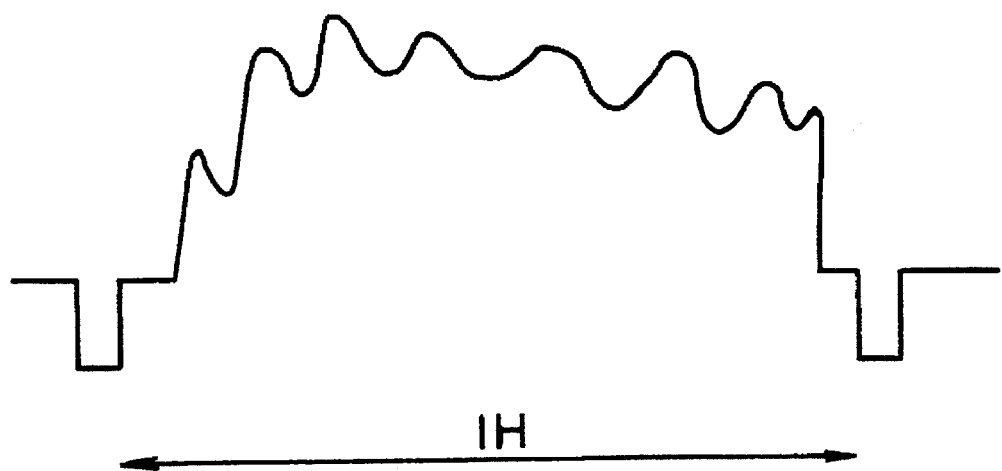
FIGS. 6(A) and 6(B) are waveform diagrams illustrating a conventional changing over method of a wide display/normal display device.
Figure 6B:
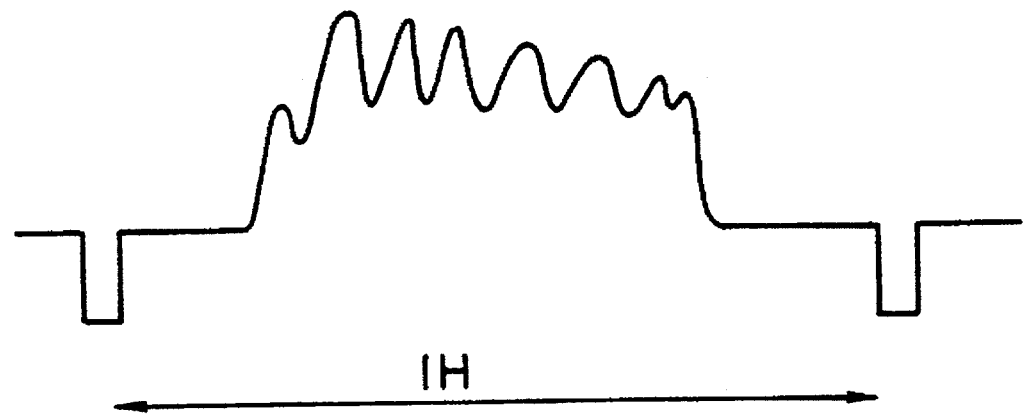

FIG. 3 is a circuit diagram showing a detailed construction example of the masking means described above. Referring to FIG. 3, a picture element array 10 forming the horizontally elongated screen is divided into a predetermined area 11B allocated to a normal display and a pair of expansion areas 12A and 12B included in a wide display. The first to Lth picture element columns belong to the expansion area 12A; the L+1th to Mth picture element columns belong to the central predetermined area 11B; and the M+1th to Nth picture element columns are included in the other expansion area 11C. The gate elements GA disposed for the expansion area 12A are individually formed from transmission gates and are connected to the corresponding data lines 3. Similarly, also the gate elements GB disposed in the predetermined area 11B are formed from transmission gates and are individually connected to the corresponding data lines 3. Also the gate elements GC disposed in the expansion area 12C are formed from transmission gates and are individually connected to the corresponding data lines 3. A predetermined masking signal MSKA is supplied to the gate elements GA and GC which belong to the expansion areas 12A and 12C, while another masking signal MSKB is supplied to the gate elements GB which belong to the predetermined area 11B. Further, a control signal CTLA and another control signal $\overline{CTLA}$, which is an inverted signal of the control signal CTLA and accordingly is indicated by CTLA with an upper horizontal bar applied thereto, are applied to control terminals of the transmission gate elements GA and GC. Another pair of control signals CTLBL and CTLBH are supplied to control terminals of the transmission gate elements GB.

With the masking means having the construction described above, upon normal display, the control signal CTLA is set to a high level so that the gate elements GA and GC are put into an open state. Consequently, the masking signal MSKA having a predetermined level is distributed to the expansion areas 12A and 12C by way of the gate elements GA and GC, respectively, so that a desired masked display is provided. On the other hand, upon wide display, the control signal CTLA is changed over to a low level so that the gate elements 12A and 12C are put into a closed state. Consequently, the masking signal MSKA is not supplied to the expansion areas 12A and 12C. Meanwhile, since a video signal is supplied to the entire picture element array 10 by way of the sampling switches SW (FIG. 1) as described hereinabove, the desired masked display is performed.

Meanwhile, the control signal CTLBL is always set to a low level while the control signal CTLBH is always set to a high level. Consequently, either a wide display or a normal display, the gate elements GB which belong to the predetermined area 11B remain in a disconnected condition. Consequently, the masking signal MSKB is not supplied to the predetermined area 11B at all. In this manner, since the gate elements GB remain in a normally off state, they need not necessarily be incorporated in the circuit. However, it is actually preferable to add the gate elements GB having an equal size as dummy gates to those of the gate elements GA and GC in order to make the loads to all of the data lines 3 equal among them. Since the gate elements GB are normally off, the masking signal MSKB may be set in principle to any level. Actually, it is preferable to set it to a level at which the leakage current of the gate elements GB exhibits a minimum level.

The active matrix display device according to the present invention includes various displays such as, for example, liquid crystal displays, a plasma display, and a plasma addressed liquid crystal display. In a liquid crystal display, each picture element is formed from a picture element electrode, a thin film transistor and so forth. The gate electrode of the thin film transistor is connected to a corresponding gate line; the source electrode is connected to a corresponding data line; and the drain electrode is connected to a corresponding picture element electrode. A substrate on which an array of such picture elements is formed is adhered to an opposing substrate on which opposing electrodes are formed with a predetermined gap left therebetween, and liquid crystal is filled and enclosed in the gap thereby to make up an active matrix liquid crystal display device. On the other hand, in a liquid crystal display device, ac reversal driving is normally performed. The ac reversal driving involves a 1H reversal corresponding to a horizontal synchronizing signal, and a 1F reversal corresponding to a vertical synchronizing signal. In the waveform diagram of FIG. 4, the video signal Vsig is reversed by a 1H reversal, and the polarity thereof is reversed with reference to a predetermined reference potential Vref for each horizontal period. In this instance, also the masking signal MSKA is a square wave which exhibits a reversal in polarity for each horizontal period. Consequently, where the liquid crystal display is in a normally white mode, the expansion areas provide a dark display, and accordingly, so-called side black processing can be performed. However, in the present invention, the display of the expansion areas in a normal display is not limited to a black display, but may be a white display or a desired intermediate color display. It is to be noted that, with respect to the other masking signal MSKB, a fixed signal, for example, of a level equal to the reference potential Vref, may be supplied so that the leakage current of the normally off gate elements GB may be suppressed, as described hereinabove.

It is to be noted that while in the embodiment described above the relationship of the numbers of stages and the positions of the stage sections and the gate elements SRA and GA, SRB and GB, and SRC and GC is selected to the 1:1, the relationship of them is not limited to this particular one. Further, even after a video signal is written into the picture element columns by way of the sampling switches SW, it is possible to effect a desired masked display in the expansion areas by writing a side masking signal by way of the gate elements GA and GC.

Having now fully described the invention, it will be apparent to one of ordinary skill in the art that many changes and modifications can be made thereto without departing from the spirit and scope of the invention as set forth herein.

Although various minor changes and modifications might be proposed by those skilled in the art, it will be understood that we wish to include within the scope of the patent warranted hereon, all such changes and modifications as reasonably come within our contribution to the art.

What is claimed is:

1. An active matrix display device, comprising:
    a plurality of picture elements disposed in rows and columns on a horizontally elongated screen, the columns of said picture elements being divided into a first area allocated to a normal display and a second area included together with the first area in a wide display;
    a gate line connected to each of the rows of said picture elements;
    a vertical drive circuit connected to the gate lines;
    a data line connected to each of the columns of said picture elements;
    a signal line for supplying a video signal;
    a plurality of sampling switches for selectively interconnecting said signal line and the data lines;
    a horizontal shift register for controlling sequential opening and closing operations of said sampling switches, said horizontal shift register being divided into a predetermined stage section which corresponds to the columns of said picture elements in said first area and an expansion stage section which corresponds to the columns of said picture elements in said second area; and
    a gate circuit interposed between said predetermined stage section and said expansion stage section for permitting said predetermined stage section and said expansion stage section to be serially connected for said wide display and operate as a common shift register and permit a sequential opening and closing of said sampling switches controlled by the predetermined stage section and said expansion stage section, said gate circuit disconnecting the expansion stage section from the predetermined stage section for said normal display.

2. An active matrix display device according to claim 1, wherein said shift register is divided into a first stage section, a second stage section, and a third stage section, and the predetermined station section corresponds to the second stage section while the expansion stage section corresponds to the first and third stage sections.

3. An active matrix display device according to claim 2, further comprising a first gate circuit connected to an input terminal of said first stage section, a second gate circuit interposed between an output of said first stage section and an input terminal of said second stage section, a third gate circuit interposed between an output terminal of said second stage section and an input terminal of said third stage section, and means for switchably controlling said first, second and third gate circuits.

4. An active matrix display device according to claim 1, further comprising masking means for supplying, upon normal display, a signal of a fixed level to the data lines which belong to said second area in order to mask said second area.

5. A horizontal shift register system, comprising:
    a first stage section corresponding to columns of normal display picture elements allocated to a normal display when the normal display is provided as part of a horizontally elongated screen;
    a second stage section corresponding to columns of wide display picture elements included in a wide display when the wide display is provided by the entire horizontally elongated screen;
    gate means for controlling connection and disconnection between said first and second stage sections such that, for said wide display, said first and second stage sections are serially connected into an integrated condition so as to effect sequential selection control of all of the columns of the normal display picture elements and the wide display picture elements, but for normal display, said second stage section is disconnected from said first stage section so as to effect sequential selection control of the columns only of the normal display picture elements; and
    a plurality of sampling switches for selectively interconnecting a signal line having a video signal thereon with said columns of said normal display picture elements and said wide display picture elements, said sampling switches being sequentially controlled by said first and second stage sections.

6. A horizontal shift register according to claim 5, further comprising masking means for masking the columns of the wide display picture elements for normal display.

* * * * *